United States Patent Office 2,732,927
Patented Jan. 31, 1956

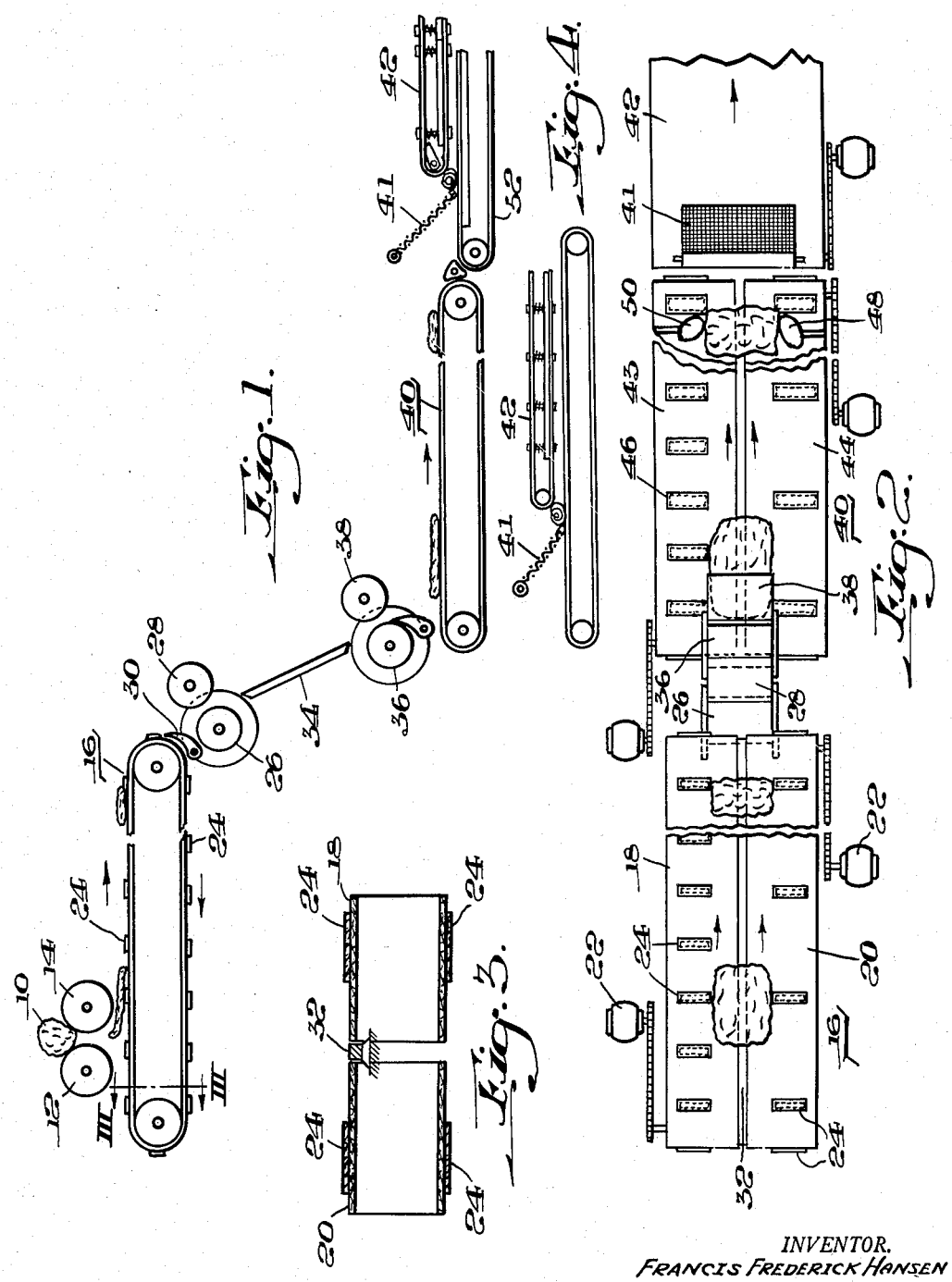

2,732,927
SHEETED DOUGH TURNER

Francis Frederick Hansen, Pittsburgh, Pa.

Application March 23, 1953, Serial No. 343,848

2 Claims. (Cl. 198—33)

This invention relates to a dough turner. More particularly the invention relates to a mechanism in a dough moulding machine by which a sheeted dough strip is arranged to be cross sheeted and/or cross curled.

When cross sheeting dough, a lump of dough is passed through a pair of sheeting rolls to flatten and elongate the lump and arrange the protein strands of dough in the strip parallel to the line of movement through the sheeting rolls. This sheeted strip while in a thin flat condition is then turned through an angle of approximately 90° to arrange the strip to pass through one or more sets of sheeting rolls to rearrange the protein strands into a lattice structure.

For cross curling a sheeted dough strip as it emerges from the last set of sheeting rolls is turned while supported in thin flat condition through an angle of approximately 90° to the line of movement through the sheeting rolls to deliver the sheeted strip to a strip curler to be curled about an axis which is the longitudinal axis of the strip.

Cross sheeting produces a loaf of bread which has a fine grain and structure. Cross curling produces a finished loaf of bread which has a uniform grain structure throughout and is free of curls or swirls in the central portion of the loaf.

Heretofore sheeted bread dough strips have been cross curled by turning the strips upside down and end to end while placing the reversed strips on a belt running at right angles to the direction in which the strips pass through the sheeting rolls. The sheeted strips are quite thin and fragile so that the flipping operation to turn and reverse the strips often acts to injure the strip. Further the strips should be handled gently, which limits the speed of the dough moulding machine. Also the accurate placing of the strips on the curling and rolling belt limits the speed of flipping to reverse the strips.

The primary object of the present invention is to provide a mechanism by which a flat strip of sheeted dough, when supported in a substantially horizontal position, may be turned or rotated about a vertical axis through any desired angle to position it to be cross sheeted or cross curled.

Another object of the invention is to provide a mechanism by which a strip of sheeted dough may be rapidly rotated, while in a flat position without wrinkling or puckering, through any desired angle and accurately positioned for a sheeting or curling operation.

With these and other objects in view the invention consists in the dough strip turning mechanism as herein illustrated and described and particularly defined in the appended claims.

The various features are illustrated in the accompanying drawings in which:

Fig. 1 is a diagrammatic view in side elevation of a dough strip turning mechanism for turning a strip of sheeted dough preparatory for cross sheeting and cross curling the strip;

Fig. 2 is a top plan view of the dough strip turning mechanism shown in Fig. 1;

Fig. 3 is a vertical sectional view taken on the line III—III of Fig. 1 of the parallel turning conveyor belts; and Fig. 4 shows the position of a curler and pressure board for receiving a sheeted strip directly from the sheeting rolls.

The present invention is a continuation-in-part of the invention described in my application Serial No. 263,572, filed December 27, 1951, for Cross and Diagonal Sheeting, and application Serial No. 306,192, filed August 25, 1952, now abandoned, for Fold Back Dough Loaf for Curling. The main feature of the invention consists in a turning mechanism by which sheeted dough strips may be turned after the dough is sheeted for cross sheeting and for cross curling. The present sheet turning mechanism may be used in conjunction with the apparatus illustrated in my application Serial No. 261,288, filed December 12, 1951, for Bread Baking, in which the dough is sheeted with sheeting rolls in which one roll turns faster than the other roll for the purpose of shearing and rupturing the surface of the sheeted strip to improve the grain and structure of the dough. If the mechanism is used with the apparatus illustrated in application Serial No. 261,288, then no advantage is obtained in cross curling the sheeted strip, but this turning mechanism would be used in conjunction with the apparatus of application Serial No. 261,288 for the purpose of cross sheeting the strip.

In the drawings a lump of dough 10 is passed between presheeting rolls 12 and 14 in order to flatten and elongate the sheet. The compression and kneading carried out with the rolls 12 and 14 is such that the protein strands of the dough are arranged parallel to the longitudinal axis of the sheeted strip, and the sheeted strip is deposited on the improved turning mechanism 16. The turning mechanism (Fig. 2) consists of parallel belts 18 and 20 which are driven to move in the same direction by means of motors 22. The motors 22 are variable speed motors so that the belt 20 may be operated to move faster than the belt 18. As an example of the operation of the belts 18 and 20, the belt 18 may be driven to have a speed of about 120 lineal feet per minute, while the belt 20 has a speed of 165 lineal feet per minute. The belts 18 and 20 are made of a textile fabric which has a resin coating that is polished to make the surface non-adhesive for sheeted dough. On the surface of each of these belts are attached raised portions 24 which are used for the purpose of rotating the sheeted dough while held in a flat position on the belts, about a vertical axis.

For cross sheeting the dough, the sheet is preferably rotated through an angle of approximately 90°, but the angle for cross sheeting may be any angle between 40 and 90°. The surface of the belts 18 and 20 are in the same plane, and the raised portions extend above the common surface of the two belts. The sheeting rolls 12 and 14 are mounted in position to deposit the sheeted strip of dough so as to be distributed substantially equally on each of the belts 18 and 20 so that the faster moving belt acts to rotate the strip as it is moved from the receiving end to the delivery end. The raised portions 24 on the belt have their inner ends spaced from the inner edges of the belts so that the distance between the inner ends of the raised portion on the belts 18 and 20 will leave a smooth surface on the belts upon which the sheeted strip may rest as it is delivered to the next set of sheeting rolls 26 and 28. A scraper 30 is mounted adjacent the belts 18 and 20 to lift the sheeted strip from the delivery end of the belts to feed it into the bight of the rolls 26 and 28.

To assist in turning the sheeted strip on the belts a central stationary pivoting member 32 is mounted between the upper runs of the belts. When the dough strip is deposited on the belts, substantially the central portion of the strip rests on the pivoting member, and this member assists in turning the dough sheet through the desired angle. The angle of turning will depend upon the relative speeds of the two belts and the distance which the strip must travel in passing from the receiving to the delivery ends of the belts. The pivoting member is preferably made of a resin which is known in the trade as "Teflon." Teflon is a resin having a composition of polytetrafluorethylene. The material is hard and may be polished on its upper surface to make it non-adhesive to bread dough. The Teflon strip extends substantially throughout the length of the upper runs of the belts 18 and 20. The pivoting member 32 should be between one-half and two inches wide to give a smooth accurate turning. To accurately guide the belts 18 and 20 to run closely to the pivot member 32, the belts are kept tight and the guide pulleys for the belts have flanges to engage each side of the belt to keep the belts in alignment.

The sheeting rolls 26 and 28 may have different diameters as described in my application Serial No. 261,288, or the rolls may have the same diameter as usually used in a sheeting operation. The strip sheeted in the rolls 26 and 28 is passed over a transfer plate 34 to a second set of sheeting rolls 36 and 38. The rolls 36 and 38 may have the same diameter or may have different diameters for the purpose of modifying the texture of the sheeted strip. The rolls 36 and 38 deliver a sheeted strip onto a turning mechanism 40. When the turning mechanism 40 is used, the strip will preferably be turned through an angle of 90° in passing from the receiving end of the turning mechanism to the delivery end of the mechanism, and then pass under a curler 41 and pressure board 42. The construction and arrangement of the turning mechanism 40 is substantially the same as the construction and arrangement of the turning mechanism 16 with the exception that belts 43 and 44 are wider than the belts 18 and 20, and the inner ends of the raised portions 46 are spaced apart farther on the belts in order to take care of the enlarged sheeted strip which is delivered from the sheeting rolls 36 and 38.

Guides 48 and 50 are mounted above the belts 44 and 43 respectively for the purpose of positioning the strip to be delivered from the turning mechanism to a curling and pressure rolling belt 52. The belts 43 and 44 are independently driven by variable speed motors so that any desired speed of operation may be obtained in turning the sheeted strip as desired. For cross curling it is preferred, however, to turn the sheet to approximately 90° so that the sheeted strip may be curled about its longitudinal axis with reference to its line of movement as it passes through the sheeting rolls 36 and 38.

Fig. 4 is illustrated as having the curler 41 and pressure roller 42 located directly below the sheeting rolls 36 and 38 to receive the sheeted dough strips and form loaves of bread dough by curling the sheeted strip about an axis which is transverse to the longitudinal axis of the dough strip as it passes through the sheeting rolls 36 and 38. When the dough is cross sheeted, especially if the sheeting rolls are those illustrated in my application Serial No. 261,288, it is not important to cross curl the dough in forming the loaf because the grain and texture of the loaf made from such a sheet is very satisfactory.

It will be noted that the dough being sheeted and formed into loaves passes in a unidirectional path from the presheeting rolls until it passes out from under the pressure board. The speed of the turning and transfer belts as well as the speed of the pressure rolls then can be regulated to pass lumps of dough at frequent intervals through the apparatus in a continuous stream.

The preferred form of the invention having been thus described, what is claimed as new is:

1. Apparatus for turning a sheeted dough piece while transporting it continuously in a forward direction comprising a pair of flat parallel belts arranged in nearly contiguous side-by-side relation and forming by their combined widths a common flat support wider than the dough piece received thereon, and means for driving both belts in the same direction but at relatively different speeds, whereby a sheet of dough supported thereon may be rotated about a vertical axis through a predetermined angle while being continuously carried along in a forward direction.

2. Apparatus as defined in claim 1 in which there is provided between the two confronting edges of the belts a fixed flat strip having a smooth top surface of substantially less width than either belt and having its surface flush with the top surface of the two belts, said strip providing a surface over which the dough slides in its rotation transition from one belt to the other and provides an area of support at the center of the sheet of dough which is stationary with respect to both belts.

References Cited in the file of this patent
UNITED STATES PATENTS

| Number | Name | Date |
|---|---|---|
| 586,866 | Potter | July 20, 1897 |
| 1,616,101 | Ackley | Feb. 1, 1927 |
| 1,763,620 | Wolfarth et al. | June 10, 1930 |
| 1,871,753 | Smith | Aug. 16, 1932 |
| 2,254,290 | Joa | Sept. 2, 1941 |
| 2,357,085 | Cohen et al. | Aug. 29, 1944 |
| 2,479,864 | Rhodes | Aug. 23, 1949 |